Feb. 19, 1963  J. I. MORGAN  3,077,761
PRESSURE GAGE MOUNTING APPARATUS
Filed Dec. 7, 1959  2 Sheets-Sheet 1
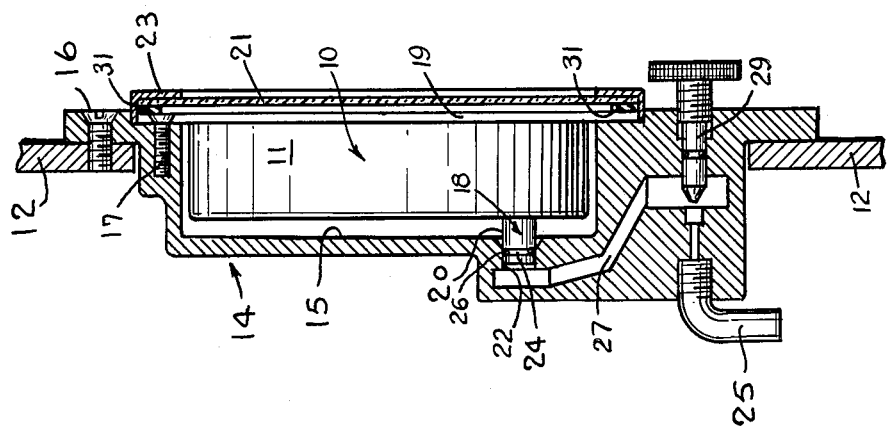
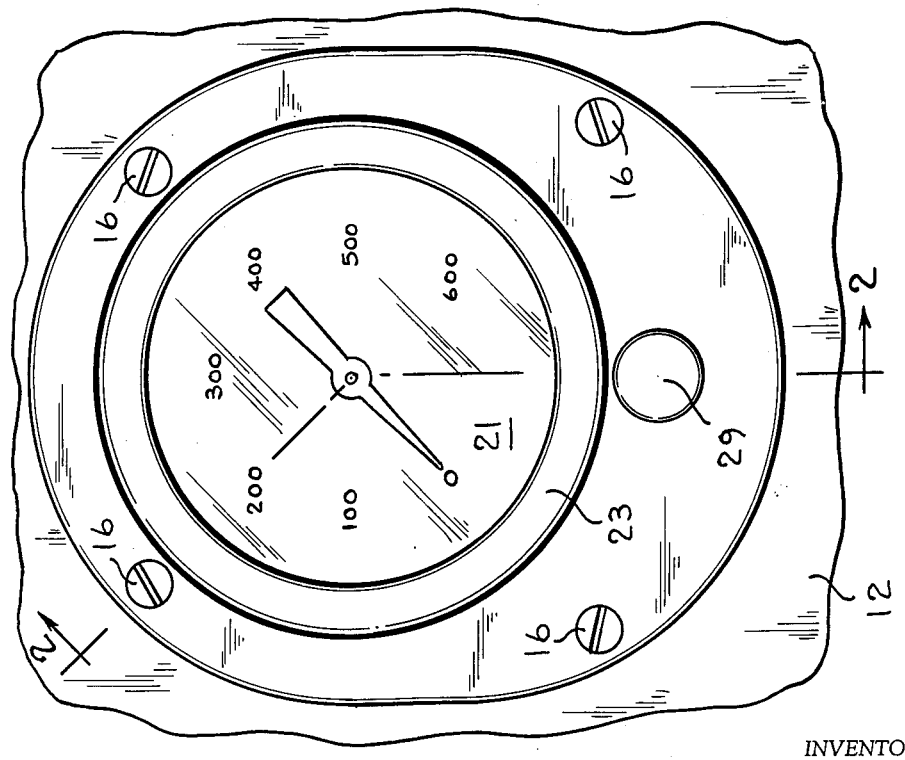
INVENTOR.
JAMES I. MORGAN
BY
John W. Michael
ATTORNEY

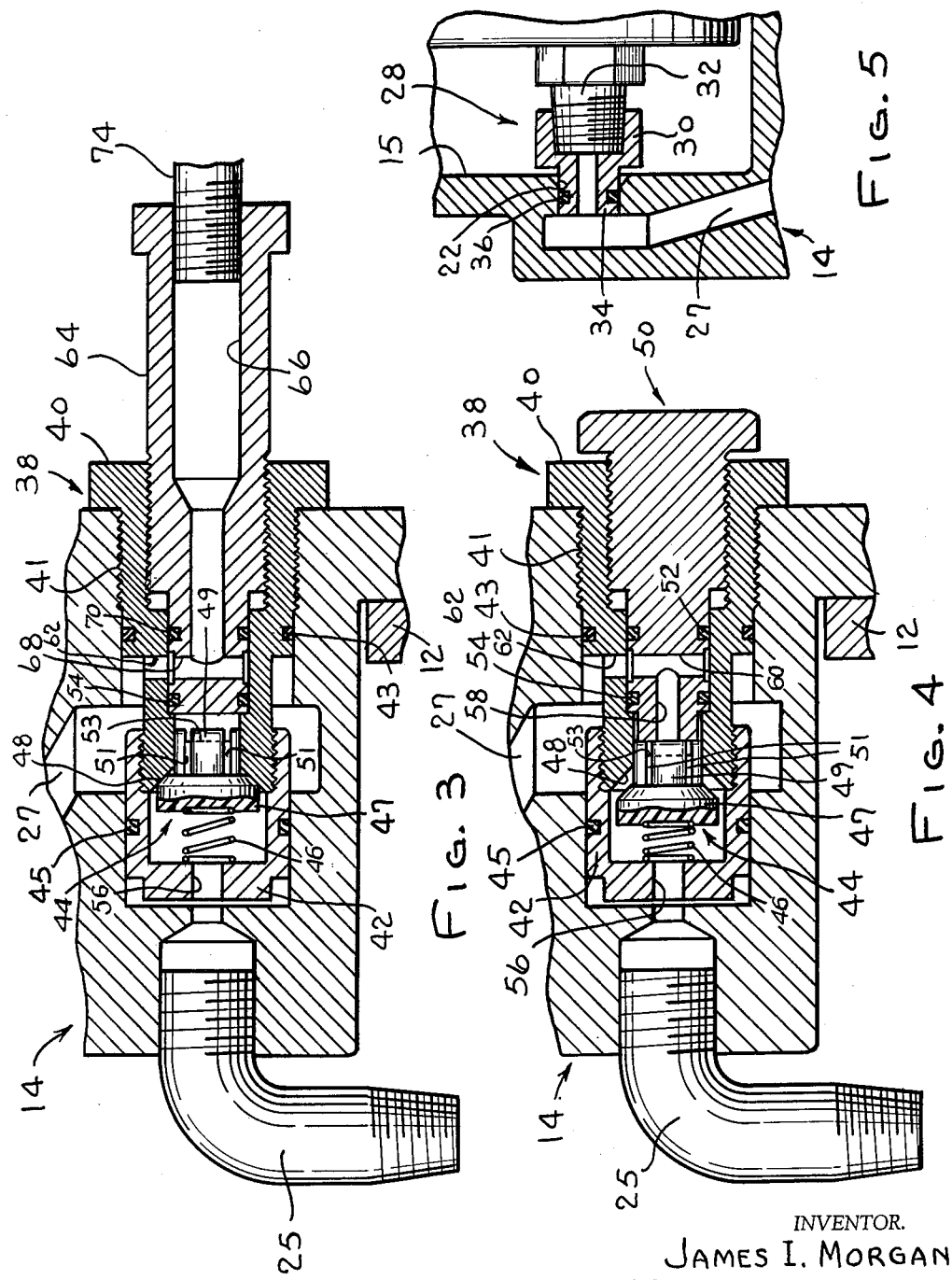

United States Patent Office 3,077,761
Patented Feb. 19, 1963

3,077,761
PRESSURE GAGE MOUNTING APPARATUS
James I. Morgan, Milwaukee, Wis., assignor to The Prime Manufacturing Co., Milwaukee, Wis., a corporation of Wisconsin
Filed Dec. 7, 1959, Ser. No. 857,591
4 Claims. (Cl. 73—4)

This invention relates generally to pressure gages and more particularly to a new and improved gage and apparatus for mounting and testing a gage.

It has long been the practice to connect a pressure gage with a fluid pressure line by means of a threaded joint at the gage stem. This arrangement necessitates disconnection and connection of the threaded joint each time a gage is removed for replacement or repair resulting in wear and frequent damage to the threads on the gage stem. It is also necessary with the conventional threaded connection to provide sufficient space at the threaded joint and access to the joint for removal and installation of the gage. This problem is of particular significance where space is of the essence and where a number of gages are mounted on a single panel such as is the case in a submarine, for example. Another problem encountered in conventional installations is the transfer of mounting stress to the gage stem causing gage error and damage to the stem.

It is the object of this invention, therefore, to provide a gage and mounting apparatus which are not subject to the disadvantages discussed above.

Another object is to provide a gage installation wherein the gage can be tested while in service and without removing it from its service installation.

The improved apparatus for mounting a pressure gage on a panel and for coupling the gage stem with a fluid pressure line includes a support member on which the gage can be removably mounted by any suitable means from the front of the panel. The means for mounting the gage on the support member is adapted to absorb substantially all the mounting stress due to the weight of the gage.

A socket is formed in the support member and is adapted to receive the gage stem as the gage is mounted in its operating position on the panel. An O-ring sealing member mounted on the gage stem serves to seal the stem in the socket. A threaded port is provided in the support member for connection to a fluid pressure line from the rear of the panel and a passageway is formed in the support member leading from the socket to the threaded port to establish communication between the gage stem and the fluid pressure line when the stem is inserted into the socket.

With the above arrangement the gage can be readily installed by simply inserting the stem into the socket in the support member and then fastening the gage body to the support member.

There are no threaded pipe joints to connect and disconnect each time a gage is removed and installed. Replacement can be made from the front of the panel requiring no space or access to the back of the panel. Substantially all the weight of the gage is supported by the mounting means independently of the sealed socket and tip connection and thus damage or leakage at such connection is prevented.

A further refinement of the improved gage mounting arrangement includes a means for testing the gage without removal thereof from the support member. Such test means includes a normally enclosed valve mounted in the passageway formed in the support member and a threaded test opening in the member communicating with the valve. A plug member is provided which is adapted when installed in the test opening to open the valve means and connect the stem to the fluid pressure line for normal service operation. When the plug is removed the valve will close and thus shut off the fluid pressure line. With the plug removed and the valve closed a test fitting is installed into the test opening. Such fitting is adapted for connection to a gage tester for testing the gage. After the gage has been tested and recalibrated if necessary the test fitting is removed and the plug is reinstalled to restore the gage to normal service operation.

Other objects and advantages will be pointed out in, or be apparent from the specification and claims, as will obvious modifications of the several embodiments shown in the drawings, in which:

FIG. 1 is a front view of a gage and gage mounting apparatus showing one embodiment of my invention;

FIG. 2 is a sectional view taken along line 2—2 of FIG. 1;

FIGS. 3 and 4 are fragmentary sectional views similar to FIG. 2 but showing a second embodiment adapted to permit testing the gage while in service; and FIG. 5 is a fragmentary sectional view showing a modification of the gage stem construction shown in FIG. 2.

Referring now to the drawings in detail, FIGS. 1 and 2 show a pressure gage 10 mounted on a panel 12 by means of a support member 14 fastened to the panel by a plurality of metal screws 16. Gage 10 is removably mounted on member 14 with the body 11 of the gage extending into a recess 15 formed in member 14, as shown. As stated above, it has long been the practice to connect the fluid pressure line directly to the gage stem by means of a threaded connection with such stem often serving as the sole or partial mounting support for the gage. To eliminate the several disadvantages of this arrangement, I provide a gage with a stem 18 having a tip portion 20 adapted for sealing engagement in a socket 22 formed in support member 14. Gage stem 18 communicates with a fluid pressure line 25 threaded into the back of member 14 by means of a passageway 27 in such member. A needle valve 29 is provided in passageway 27 to shut off line 25 for removal of gage 10.

Tip portion 20 of stem 18 is of cylindrical shape having a peripheral groove 24 in the surface thereof in which an O-ring sealing member 26 is mounted for sealing engagement with socket 22 when the gage is installed in member 14 as shown in FIG. 2. Tip portion 20 can be made integral with the valve stem 18 (FIG. 2) or as part of an adapter fitting 28 (FIG. 5) designed for use on a gage having a conventional threaded stem 32. As clearly shown in FIG. 5, fitting 28 includes a threaded body portion 30 adapted for connection with threaded gage stem 32 and a cylindrical tip portion 34 with an O-ring 36 adapted for sealing engagement in socket 22.

Any suitable means may be employed for removably mounting the gage in recess 15 such as a plurality of metal screws 17 threaded into member 14 through a flange 19 on the gage as shown in FIG. 2. The gage may be equipped with a lens 21 of transparent material held in position by a trim ring 23 against a ring gasket 31.

From the foregoing, it will be appreciated that gage 10 can be very readily installed or removed from member 14 by simply removing ring 23, lens 19 and screws 17 and sliding the gage in and out of recess 15 after needle valve 29 has been closed. There are no threaded pipe joints to connect and disconnect. Replacement can be made from the front of panel 12, no space or access being required at the back of the panel. Substantially the entire weight of the gage is supported by screws 17 independently of the sealed socket and tip connection for the gage stem which acts as sort of a "floating connection" between the gage and the fluid pressure line.

As a further refinement to my improved gage mounting arrangement described above, I provide a means (FIGS. 3 and 4) for testing the gage without removal thereof from support member 14. As shown in FIGS. 3 and 4, the test means includes a test fitting 38 having a hollow main body 40 threaded into a threaded test opening 41 in member 14 and sealed therein by an O-ring 43. A valve member 44 is slidably mounted in the end of member 40 and biased towards a seat 48 formed on the member by a compression spring 46. A valve spring retainer member 42 threaded on the end of member 40 and sealed to the wall of opening 41 by an O-ring 45 serves to hold spring 46 and valve 44 in place at the end of body 40 as shown. Valve member 44 has a head 47 which tapers to a tail section 49. The tail section has a plurality of lands or grooves 51 in its sides and a recess 53 in the end to permit air to flow past the valve when opened. Thus, it is seen that the entire test assembly including body 40, valve 44, spring 46 and retainer 42 can be installed as a unit in threaded opening 41.

For normal service operation of gage 10 a plug member 50 having O-ring sealing members 52 and 54 is threaded into body 40 as shown. The end of plug 50 when installed (FIG. 3) will slide valve 44 to the left against the bias of spring 46 to establish communication between fluid pressure line 25 and passageway 27 leading to the gage. With the valve held open air or other fluid can flow from line 25 through opening 56 in the end retainer 42, around valve 44, through passageways 58, 60 in plug 50 and then out to passageway 27 through an opening 62 in body 40.

When it is desired to test gage 10, plug 50 is removed allowing valve 44 to close and thus shut off line 25. A test fitting 64 having an axial passageway 66 terminating in a lateral passageway 68 is threaded into body 40 as shown in FIG. 4. Fitting 64 is sealed in body 40 by a pair of O-rings 70, 72 with lateral passageway 68 in alignment with opening 62 in body 40 to establish communication between the test fitting and passageway 27 leading to gage 10. Test pressure is then applied to the gage by a suitable gage testing apparatus through a line 74 threaded in the end of fitting 64. After the gage has been tested and recalibrated as necessary fitting 64 is removed and plug 50 reinstalled to again open valve 44 and return the gage to normal service position (FIG. 3).

Although several embodiments of the present invention have been illustrated and described, it will be apparent to those skilled in the art that various changes and modifications may be made therein without departing from the spirit of the invention or from the scope of the appended claims.

I claim:

1. Apparatus for mounting a pressure gage having a gage stem on a panel and for coupling the gage stem with a fluid pressure line comprising, a support member mounted on the panel, mounting means for removably mounting the gage on said support member, said mounting means adapted to absorb substantially all of the mounting stress due to the weight of the gage, a socket formed in said support member adapted to receive the gage stem as the gage is mounted in its operating position on the panel, an O-ring sealing member mounted on the stem adapted to seal the stem in said socket, a port in said support member adapted for connection to a fluid pressure line, a passageway formed in said support member leading from said socket to said port to establish communication between the gage stem and the fluid pressure line, and test means adapted to permit testing the gage while mounted in operating position on said support member, said test means including a normally closed valve means movably mounted in said passageway, a threaded test opening in said support member communicating with said valve means, a plug member adapted when installed in said opening to open said valve means and connect the gage stem to the fluid pressure line for normal service operation, said plug member further adapted when removed to allow said valve means to close and shut off the fluid pressure line, and a test fitting adapted when installed in said test opening after said plug has been removed to connect the gage stem with a source of test pressure for testing the gage.

2. Apparatus according to claim 1 in which said valve means includes a hollow body member mounted in said test opening, a valve member movable in and out of sealing engagement with a valve seat formed on said body member, a spring adapted to bias said valve member to its closed position, and a retainer member mounted on said body member and adapted to hold said spring and valve member in place.

3. Apparatus for mounting a pressure gage having a gage stem on a panel and for coupling the gage stem with a fluid pressure line comprising, a support member having a recess formed therein and mounted on the panel, mounting means for removably mounting the gage on said support member with the body of the gage positioned in the recess formed in said support member, said mounting means adapted to absorb substantially all of the mounting stress due to the weight of the gage and operable from the front of the panel for mounting and removing the gage from said support member, a socket formed in said support member adapted to receive the gage stem as the gage is mounted in its operating position on said support member, an O-ring sealing member mounted on the gage stem adapted to seal the stem in said socket, a threaded port in said support member adapted for connection to a fluid pressure line from the rear of said panel, and a passageway formed in said support member leading from said socket to said threaded port to establish communication between the gage stem and the fluid pressure line when the gage stem is inserted into said socket, and a test means adapted to permit testing the gage while mounted in operating position on said support member, said test means including a normally closed valve means movably mounted in said passageway, a threaded test opening in said support member communicating with said valve means, a plug member adapted when installed in said opening to open said valve means and connect the gage stem with the fluid pressure line for normal service operation, said plug member further adapted when removed to allow said valve means to close and shut off the fluid pressure line, and a test fitting adapted when installed in said test opening after said plug has been removed to connect the gage stem with a source of test pressure for testing the gage.

4. Apparatus according to claim 3 in which said valve means includes a hollow body member mounted in said test opening, a valve member movable in and out of sealing engagement with a valve seat formed on said body member, a spring adapted to bias said valve member to its closed position, and a retainer member mounted on said body member and adapted to hold said spring and valve member in place.

References Cited in the file of this patent

UNITED STATES PATENTS

| 719,968 | Wood | Feb. 3, 1903 |
| 1,463,804 | Drager | Aug. 7, 1923 |
| 2,881,011 | Coughlin | Apr. 7, 1959 |
| 2,886,971 | Gorham | May 19, 1959 |
| 2,927,602 | Eklund | Mar. 8, 1960 |

FOREIGN PATENTS

| 730,049 | Great Britain | May 18, 1955 |